United States Patent [19]

Aso et al.

[11] Patent Number: 4,868,363

[45] Date of Patent: Sep. 19, 1989

[54] APPARATUS FOR SUPPLYING A WORKING FLUID IN AN ELECTRIC DISCHARGE MACHINE

[75] Inventors: Toshiyuki Aso; Toyotada Kajitori, both of Yamanashi, Japan

[73] Assignee: Fanuc Ltd., Yamanashi, Japan

[21] Appl. No.: 292,940

[22] Filed: Jan. 3, 1989

[30] Foreign Application Priority Data

Jan. 9, 1988 [JP] Japan ..................................... 63-1809

[51] Int. Cl.⁴ ........................... B23H 1/10; B23H 7/02
[52] U.S. Cl. .................................. 219/69.14; 137/601; 219/69.12
[58] Field of Search ............... 219/69 D, 69 W, 69.14, 219/69.12; 204/224 M; 137/601

[56] References Cited

U.S. PATENT DOCUMENTS 4,709,131 11/1987 Del Bello et al. ................. 219/69 D

FOREIGN PATENT DOCUMENTS

| 3444607 | 6/1986 | Fed. Rep. of Germany ... | 219/69.14 |
| 138546 | 8/1982 | Japan .................................. | 219/69.14 |
| 134625 | 8/1984 | Japan .................................. | 219/69.14 |

Primary Examiner—A. D. Pellinen
Assistant Examiner—Geoffrey S. Evans
Attorney, Agent, or Firm—Staas & Halsey

[57] ABSTRACT

A working fluid supplying apparatus of an electric discharge machine comprises a main pipe and a branching pipe for connecting a pump for increasing a working fluid in pressure and delivering the thus pressurized working fluid with a nozzle for injecting the pressurized working fluid, these pipes being connected in parallel to each other, and respectively provided therein with a servo valve for flow rate control, which has its valve opening in accordance with a command indicative of a target flow rate and supplied from a controller, and an on-off valve which is rendered open upon a predetermined servo valve opening being reached, whereby non-linearity between the servo valve opening and the flow rate of the working fluid flowing through the main pipe provided with the servo valve is compensated for by the working fluid supplied through the branching pipe provided with the on-off valve so as to achieve a liner control of the working fluid flow rate even when the target flow rate increases beyond a value corresponding to the predetermined servo valve opening.

7 Claims, 1 Drawing Sheet

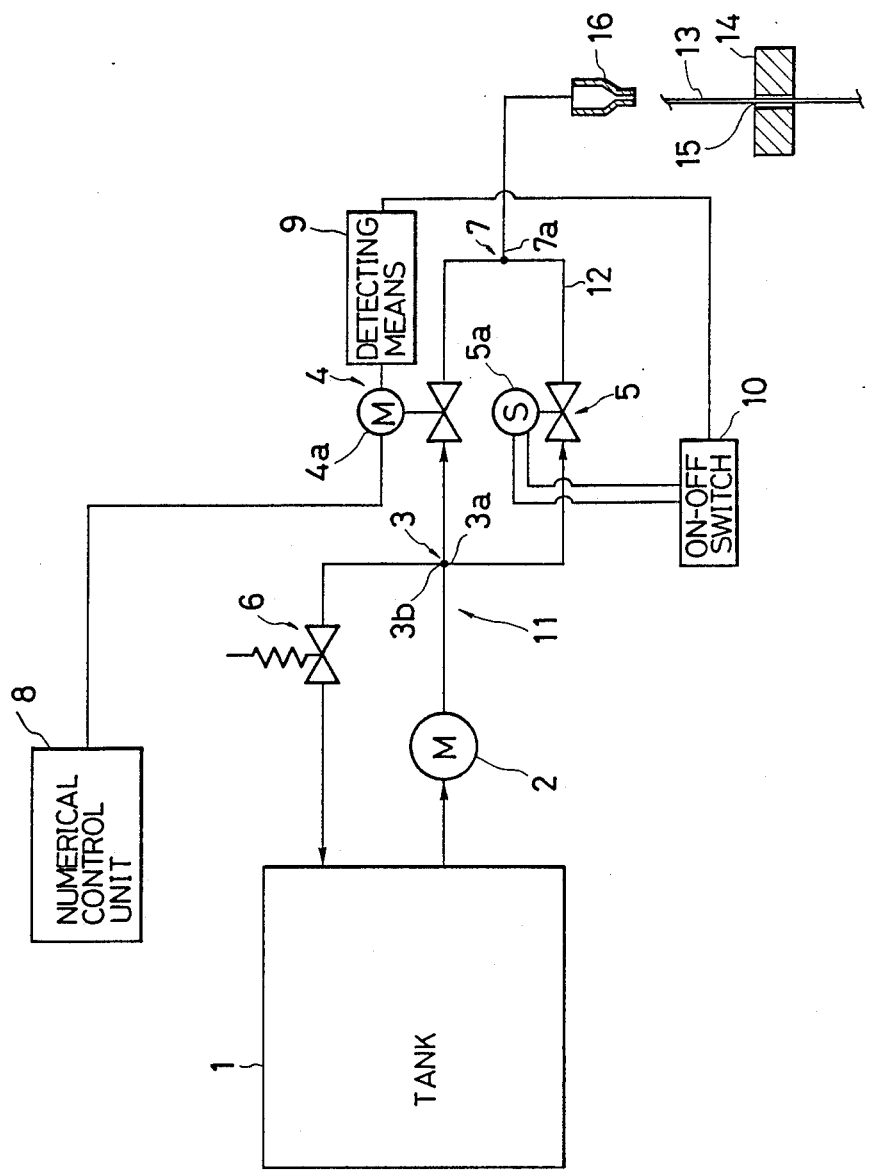

APPARATUS FOR SUPPLYING A WORKING FLUID IN AN ELECTRIC DISCHARGE MACHINE

BACKGROUND OF THE INVENTION

The present invention relates to an apparatus for supplying a working fluid in an electric discharge machine, and more particularly to an apparatus of this kind, which is capable of linearly controlling the supply of the working fluid.

In an electric discharge machine, a working region is supplied with a working fluid such as water for cooling, keeping electric insulation for electric machining, and discharging machining chips. For instance, in a wire-cut electric discharge machine, the working fluid is supplied through an injection nozzle to a gap between a wire electrode and a workpiece. As an amount or pressure of supply of the working fluid is increased, the machining chips are easily discharged and hence efficiency in electric discharge machining is increased so that machining speed is improved. On the other hand, an increased working fluid pressure causes the wire electrode to vibrate and a turbulent flow, accompanied with bubbles, occurs and results in the wire electrode being cut off. Accordingly, it is necessary to control the working fluid amount to a desired value, preferably in a linear manner.

To this end, conventionally, in a wire-cut electric discharge machine of a type supplying the working fluid from a working fluid tank to an injection nozzle, the flow rate of the working fluid is controlled by controlling the rotational speed of a motor of a variable displacement type pump provided between the tank and the nozzle by means of invertor control. However, according to invertor control, a pulsation is found in the motor rotation and hence in the flow of the working fluid at low motor speeds. Further, invertor control has a restriction relating to power supply voltage. Moreover, a surge current or voltage can be generated in invertor control wherein an electric current or voltage applied to the motor is intermittently turned on and off, resulting in damaging to a surge absorber provided for protection of a control system of the electric discharge machine.

SUMMARY OF THE INVENTION

The object of the present invention is to provide an apparatus for supplying a working fluid, which is capable of linearly controlling the supply of the working fluid with a simplified arrangement, without the need of using invertor control.

According to the present invention, an apparatus for supplying a working fluid in an electric discharge machine is provided, in which a pump for increasing a pressure of the working fluid and delivering the working fluid and a nozzle for injecting the working fluid having the thus increased pressure are connected to a main pipe and a branching pipe, respectively. These pipes are connected in parallel to each other, and are provided with a servo valve for flow rate control and an on-off valve, respectively. A valve opening of the servo valve is controlled in accordance with a command indicative of a target working fluid flow rate and supplied from a controller. Upon detection of a predetermined servo valve opening, the on-off valve is caused to open by on-off means, whereby a linear control of the flow rate of the working fluid can be achieved even in a region in which the target flow rate exceeds a value corresponding to the predetermined servo valve opening.

BRIEF DESCRIPTION OF DRAWING

A single FIGURE is schematic view showing a working fluid supplying apparatus according to an embodiment of the present invention.

DETAILED DESCRIPTION

Referring to the accompanied drawing, a working fluid supplying apparatus according to an embodiment of the present invention, which is provided in a wire-cut electric discharge machine, will be explained.

The working fluid supplying apparatus comprises a tank 1 for reserving a working fluid, and a pump 2 for increasing the pressure of the working fluid supplied from the tank 1 and delivering the fluid increased in pressure, the pump being comprised of a fixed displacement type of pump, for instance. The pump 2 is connected to a servo valve 4 for flow rate control through a main pipe 11 which has an intermediate portion connected with a cross pipe fitting 3 at one of discharge lines of the same fitting and is arranged to linearly and variably control the flow rate of the working fluid flowing therethrough in the range from 2 liter/min. to 14 liter/min. One 3a of the remaining discharge lines of the pipe fitting 3 is coupled to one end of a branching pipe 12 having another end which is coupled to the main pipe 11 through a three way pipe fitting 7. Provided intermediate of the branching pipe 12 is an electromagnetic on-off valve 5 which selectively assumes either one of its open and closed states. The arrangement including the main pipe 11, branching pipe 12, servo valve 4 and on-off valve 5 is designed so as to achieve linear control of the working fluid flow rate even when the flow rate increases beyond the upper limit (14 liter/min.) of the linearly controllable region of the flow rate control effected by only the servo valve 4. In other words, the arrangement is so designed that an amount of the working fluid, which is enough to compensate for nonlinearity between the servo valve opening and the flow rate due to a pressure loss in the servo valve 4 at the above-mentioned large flow rate region, is supplied through the branching pipe 12 provided with the on-off valve 5 which is opened at such large flow rate region.

The three way pipe fitting 7 has a discharge line 7a connected to a nozzle 16 for injecting the working fluid to a gap 15 between a wire electrode 13 and a workpiece 14. Further, one end of a relief valve 6 having another end communicated with the tank 1 is coupled to the remaining one discharge line 3b of the cross pipe fitting 3. The relief valve 6 serves to prevent the pump 2 from overheating due to an increase in pressure of the pump 2 at its discharge side. To this end, the valve 6 is operable to cause the working fluid to return to the tank 1 when the servo valve 4 is almost fully closed or when the same valve is rendered inoperative upon failure.

The servo valve 4 has a motor 4a connected in control relation to a numerical control unit 8 for delivering a command indicative of a target flow rate of the working fluid, the unit also having a function of controlling various operations of the electric discharge machine. Meanwhile, the motor 4a is connected with a power supply, not shown. Further, disposed in facing relation with the output shaft of the motor 4a is detecting means, comprised of a limit switch 9, for instance, which is arranged to generate an output signal when the motor shaft rotates to its rotational position corresponding to a predetermined valve opening of the servo valve 4. An on-off switch 10 is provided, which responds to the output signal from the limit switch to energize a solenoid 5a of the magnetic on-off valve 5, so as to render the same valve to be fully opened. In the meantime, the switch 10 is connected to a power supply, not shown.

In operation, the pump 2 runs at its nominal rotational speed so that the working fluid supplied from the tank 1 is increased in pressure by the pump 2 and is delivered. When a target flow rate of the working fluid, varying in dependence on a command supplied from the numerical control unit 8, falls within a range from 2 liter/min. to 14 liter/min., the on-off valve 5 is kept closed, and hence the working fluid is supplied to the nozzle 16 through the main pipe 11 provided with the servo valve 4 which operates to control the flow rate of the working fluid to the target value. At this time, a linear relationship is established between the servo valve opening and the working fluid flow rate. In addition, no pulsation occurs in the flow of the working fluid even if the flow rate of the working fluid is small, as distinct from the conventional arrangement of the above-mentioned type.

When the target flow rate of 14 liter/min. is reached, the servo valve 4 is controlled to have its predetermined valve opening, and this is detected by the limit switch 9 the resultant output signal of which is applied to the on-off switch 10 by which the solenoid 5a of the on-off valve 5 is energized to render the same valve to be opened. The above-mentioned linear relationship is no longer present between the servo valve opening and the working fluid flow rate in a region where flow rate has a value more than 14 liter/min. due to a pressure loss in the servo valve 4. However, in such large flow rate region, the on-off valve 5 is opened so that the working fluid is permitted to flow through both the main pipe 11 and the branching pipe 12. As a result, non-linearity between the servo valve opening and the working fluid flow rate is compensated for by the working fluid flowing through the branching pipe 12. That is, the linear relationship between the servo valve opening and the flow rate of the working fluid flowing through both the pipes 11, 12 is established. In this connection, even when the target flow rate exceeds 14 liter/min., the numerical control unit 8 delivers a command indicative of the target flow rate to the servo valve 4 in the same manner as in the ordinary flow rate region of 2 liter/min. to 14 liter/min. On this occasion, the flow rate corresponding to the target flow rate flows through the both pipes 11, 12. In the present embodiment, the linear flow rate control can be achieved in the region having an upper limit of 20 liter/min.

When the target flow rate is decreased to 2 liter/min., the servo valve 4 is rendered to be nearly fully closed. At this time, the relief valve 6 opens with an increase in pressure of the pump 2 at its discharge side, so that an excessive working fluid returns to the tank 1 therethrough. An excessive increase in pressure of the pump at its discharge side is prevented similarly when the servo valve 4 is rendered inoperative upon failure. As distinct from the conventional arrangement using invertor control, according to the arrangement explained above, no restriction regarding power supply voltage is present and no damage to a surge absorber provided in a control system of the electric discharge machine is found.

In the above-mentioned embodiment, the on-off switch 10 operates in response to an output signal from detecting means, comprised of the limit switch 9, for instance, for detecting the predetermined servo valve opening being reached. Alternatively, an operation command for operating the on-off switch may be delivered from the numerical control unit 8 at the same time it delivers a flow rate command corresponding to the predetermined servo valve opening.

What is claimed is:

1. An apparatus for supplying a working fluid in an electric discharge machine, comprising:
   a pump for increasing a pressure of the working fluid and delivering the thus pressurized working fluid;
   a nozzle for injecting the pressurized working fluid;
   a main pipe connecting said pump with said nozzle;
   a branching pipe connected to said main pipe in parallel therewith between said pump and said nozzle;
   a servo valve for flow rate control provided in said main pipe;
   an on-off valve provided in said branching pipe;
   a controller for delivering a command indicative of a target flow rate of the working fluid; and
   on-off means for causing said on-off valve to open when arrival of a predetermined valve opening of said servo valve is detected.

2. An apparatus according to claim 1, wherein said main pipe, said branching pipe, said servo valve and said on-off valve are arranged so that non-linearity between the valve opening of said servo valve and the flow rate of the working fluid which occurs when the servo valve opening exceeds said predetermined valve opening is compensated for by the supply of the working fluid through said branching pipe to keep a linear relationship between the servo valve opening and the flow rate of the working fluid.

3. An apparatus according to claim 1, wherein said pump is a fixed displacement type of pump.

4. An apparatus according to claim 1, wherein said servo valve includes a motor responsive to the command from said controller to adjust the valve opening of said servo valve.

5. An apparatus according to claim 1, wherein said on-off means includes an on-off switch.

6. An apparatus according to claim 1, wherein said on-off means includes detecting means for detecting said predetermined valve opening being reached.

7. An apparatus according to claim 1, wherein said electric discharge machine is a wire-cut electric discharge machine, said nozzle being operable to inject the working fluid to a gap between an wire electrode of said wire-cut electric discharge machine and a workpiece.

* * * * *